(12) United States Patent
Hayashi et al.

(10) Patent No.: US 8,573,638 B2
(45) Date of Patent: Nov. 5, 2013

(54) HEAD-PROTECTING AIRBAG APPARATUS

(75) Inventors: Takeki Hayashi, Kiyosu (JP); Taizo Suemitsu, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/479,460

(22) Filed: May 24, 2012

(65) Prior Publication Data

US 2012/0299276 A1   Nov. 29, 2012

(30) Foreign Application Priority Data

May 26, 2011   (JP) ................................. 2011-118110

(51) Int. Cl.
*B60R 21/213* (2011.01)
*B60R 21/232* (2011.01)

(52) U.S. Cl.
USPC ..................................... 280/730.2; 280/728.2

(58) Field of Classification Search
USPC ........................................... 280/730.2, 728.2
IPC ......................................... B60R 21/213,21/232
See application file for complete search history.

(56) References Cited

U.S. PATENT DOCUMENTS

| | | | | |
|---|---|---|---|---|
| 6,049,963 | A * | 4/2000 | Boe ............... | 29/525.01 |
| 7,040,647 | B2 * | 5/2006 | Deligny et al. ............ | 280/728.2 |
| 7,597,345 | B1 * | 10/2009 | Kim ............. | 280/728.2 |
| 7,607,685 | B2 | 10/2009 | Jang et al. | |
| 7,762,581 | B2 * | 7/2010 | Kino et al. ................. | 280/730.2 |
| 7,780,187 | B2 * | 8/2010 | Minamikawa ............ | 280/728.2 |
| 7,896,389 | B2 | 3/2011 | Jang et al. | |
| 2007/0241543 | A1 | 10/2007 | Jang et al. | |
| 2012/0267879 | A1 * | 10/2012 | Kim et al. ................. | 280/730.2 |

FOREIGN PATENT DOCUMENTS

| | | | |
|---|---|---|---|
| JP | A-2008-184056 | | 8/2008 |
| JP | A-2008-279944 | | 11/2008 |
| JP | A-2009-006892 | | 1/2009 |
| JP | 2009023439 A | * | 2/2009 |
| JP | A-2009-090712 | | 4/2009 |
| JP | A-2009-226994 | | 10/2009 |
| JP | A-2010-126078 | | 6/2010 |
| JP | A-2010-149541 | | 7/2010 |
| JP | A-2010-149857 | | 7/2010 |
| JP | A-2010-208525 | | 9/2010 |
| JP | A-2011-031726 | | 2/2011 |
| JP | 2011102102 A | * | 5/2011 |

\* cited by examiner

*Primary Examiner* — Paul N Dickson
*Assistant Examiner* — Joselynn Y Sliteris
(74) *Attorney, Agent, or Firm* — Posz Law Group, PLC

(57) ABSTRACT

In a head-protecting airbag apparatus, an airbag is folded up and housed in a case that is made from synthetic resin and has an inverse U-shaped sectional contour opening downward. The airbag includes a plurality of mounting portions, and the mounting portions are taken out to an outer circumference of the case to be fastened to the vehicle body structure. The case includes a retaining projection that is inserted through a retaining hole formed on the upper rim of the airbag for retaining the upper rim of the airbag, and a retaining tongue that has a cantilever structure so as to be flexible toward an inner side of the case. A section of the airbag in a vicinity of the retaining hole is placed over an outer circumferential surface of the retaining tongue such that the retaining projection is inserted through the retaining hole.

4 Claims, 10 Drawing Sheets

HEAD-PROTECTING AIRBAG APPARATUS

CROSS REFERENCE TO RELATED APPLICATIONS

The Present application claims priority from Japanese Patent Application No. 2011-118110 of Hayashi et al., filed on May 26, 2011, the disclosure of which is hereby incorporated into the present application by reference.

BACKGROUND OF THE INVENTION

1. Field of the Invention

The present invention relates to a head-protecting airbag apparatus that includes an airbag for deployment over a vehicle window and a case that houses the airbag, in which the airbag is folded up in such a manner that its lower rim is brought close to its upper rim and the case is fabricated of synthetic resin and has an inverse U-shaped sectional contour opening downward, in an on-board state.

2. Description of Related Art

In this kind of head-protecting airbag apparatuses, it is known, as disclosed in JP 2008-184056, that an airbag, which is so folded up that its lower rim is brought close to its upper rim, is housed in a case of synthetic resin in consideration of a protection of the airbag before and after the mounting on a vehicle and of convenience in handling, e.g., in transportation. The case has an inverse U-shaped sectional contour opening downward, in an on-board state. The airbag includes along the upper rim a plurality of mounting portions projecting upward. The mounting portions are taken out of the case and fastened to a vehicle body structure along an upper rim of and along a front and rear direction of a window of the vehicle, thereby the airbag is mounted on the vehicle together with the case.

In this conventional head-protecting airbag apparatus, the housing work of the airbag in the case must be conducted carefully, because the airbag can sometimes be housed in a case as it is twisted between the mounting portions. However, it takes a lot of man-hours to house the folded-up airbag while taking out the mounting portions one by one.

SUMMARY OF THE INVENTION

An object of the present invention is to provide a head-protecting airbag apparatus which will enable a folded-up airbag to be easily housed in a case without causing twisting of the airbag.

The object of the invention can be achieved by a following head-protecting airbag apparatus adapted to be mounted on a vehicle body structure, along an upper rim of and along a front and rear direction of a window of the vehicle. The apparatus includes:

an airbag for deployment over the window, the airbag being folded up in such a manner that a lower rim thereof is brought close to an upper rim thereof, and including a main body, a plurality of mounting portions that are located along an upper rim of the main body and serve for attachment to the vehicle body structure, and a retaining hole that pierces the upper rim of the main body and is located between at least one pair of adjoining mounting portions; and a case made from synthetic resin and has an inverse U-shaped sectional contour opening downward, and houses the airbag with the mounting portions of the airbag taken out to an outer circumference of the case such that the case is mounted on the vehicle together with the airbag by fastening of the mounting portions to the vehicle body structure, the case including:

a retaining projection that protrudes from the outer circumference of the case at a location corresponding to the retaining hole of the airbag and is inserted through the retaining hole for retaining the upper rim of the airbag;

a pair of openings that are formed in front of and at the rear of the retaining projection in such a manner as to extend toward an outboard direction from an inboard side edge of the case; and a retaining tongue that is formed between the openings and has a cantilever structure so as to be flexible toward an inner side of the case, wherein a section of the airbag in a vicinity of the retaining hole is placed over an outer circumferential surface of the retaining tongue via the openings in order that the retaining projection is inserted through the retaining hole.

With the head-protecting airbag apparatus of the invention, the housing of the airbag in the case is conducted step by step from the front side or from the rear side. Specifically, the foremost or rearmost mounting portion is taken out from the inner side to the outer side of the case, and the airbag is housed inside the case. Then the next mounting portion is taken out from the inner side to the outer side of the case, and the airbag is housed inside the case. This process is repeated until the airbag is thoroughly housed in the case.

In doing the above-described process, the section of the airbag in the vicinity of the retaining hole is taken out via the openings of the case and placed over the outer circumferential surface of the retaining tongue to insert the retaining projection through the retaining hole. If, at this time, twisting occurs between the mounting portions, the section of the airbag in the vicinity of the retaining hole can be also twisted and therefore cannot be taken out via the openings and placed over the outer circumferential surface of the retaining tongue of the case. That is, twisting is here detected immediately and corrected such that the retaining projection is inserted through the retaining hole, and then the next mounting portion is taken out to the outer side of the case. As a result, the airbag is housed in the case in a proper fashion.

Moreover, since the leading end region of the retaining tongue of the case is flexible toward an inner side of the case, the retaining projection can be put through the retaining hole easily by pushing the retaining tongue inward, which will not increase the time required for the housing work.

Therefore, with the head-protecting airbag apparatus of the invention, the folded-up airbag is easily housed in the case without causing twisting of the airbag.

In the head-protecting airbag apparatus of the invention, it is desired that:

the main body of the airbag has a hollow-weave construction and includes a gas admissive region that is inflatable with an inflation gas in such a manner as to separate an inboard side wall and an outboard side wall, and a peripheral portion that is located around the gas admissive region and is so formed that the inboard side wall and the outboard side wall are connected to each other;

the main body is one of a plurality of main bodies that are arranged in parallel and hollow woven at a time and then is subjected to cutting; and the retaining hole is comprised of a positioning hole that is used for the cutting of the main bodies and is located on the peripheral portion, in the upper rim of the main body.

This configuration will eliminate the need to form a separate retaining hole, thereby facilitating the manufacturing of the airbag.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
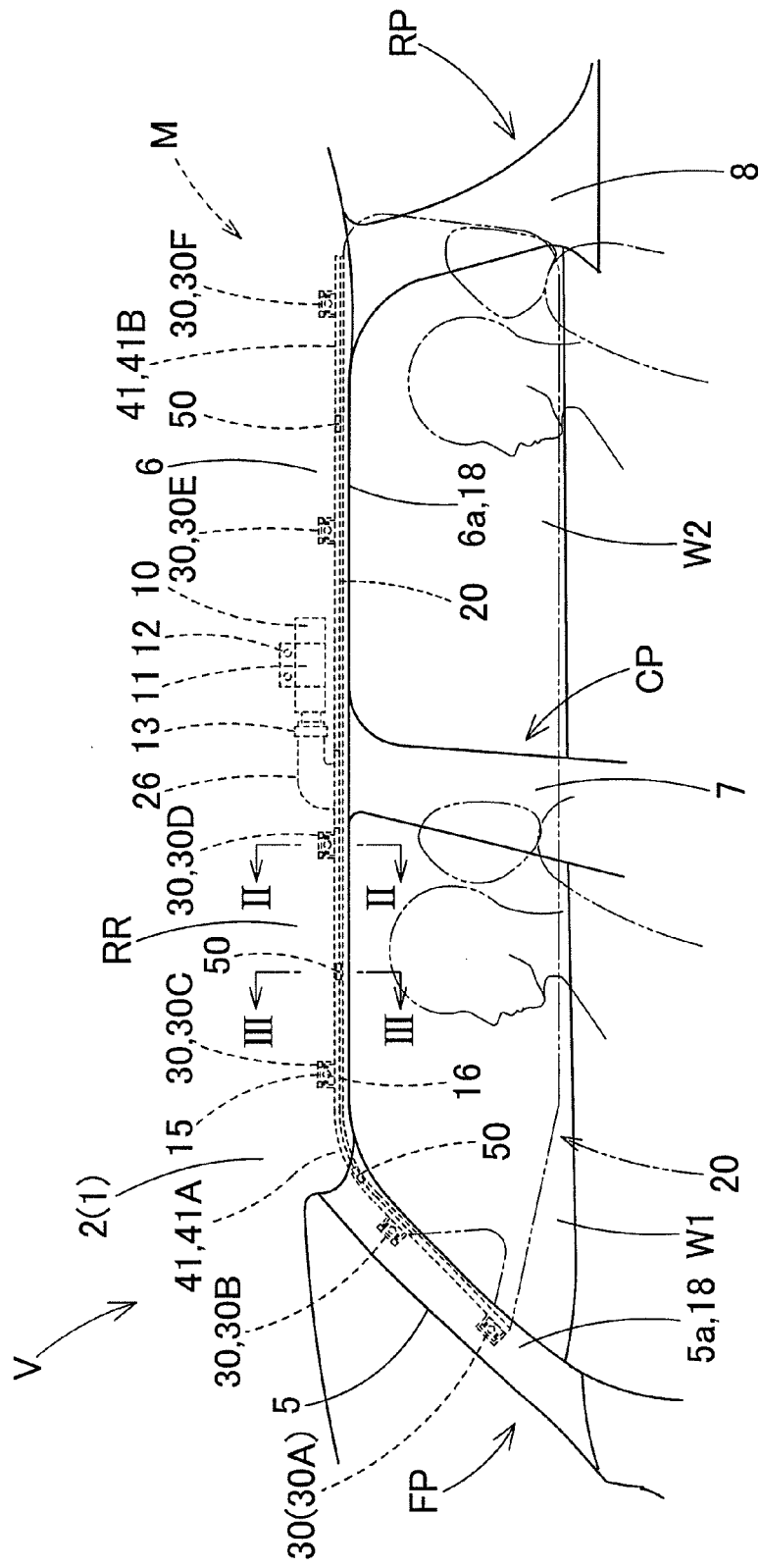
FIG. 1 is a front elevation of a head-protecting airbag apparatus embodying the present invention as mounted on a vehicle, viewed from an interior of the vehicle.

FIG. 1 illustrates a head-protecting airbag apparatus M embodying the present invention. An airbag 20 of the airbag apparatus M is folded up and stored in peripheral regions of upper rims of windows (side windows) W1 and W2 of a vehicle V, i.e., in an area from a front pillar FP to a region above a rear pillar RP via a roof side rail RR so it covers the windows W1 and W2 upon deployment. The vehicle V includes a middle pillar CP disposed generally vertically between the front pillar FP and the rear pillar RP. The airbag 20 is designed to also cover an inboard side of a middle pillar garnish 7 of the middle pillar CP and an inboard side of a rear pillar garnish 8 partly upon deployment.

Figure 5:
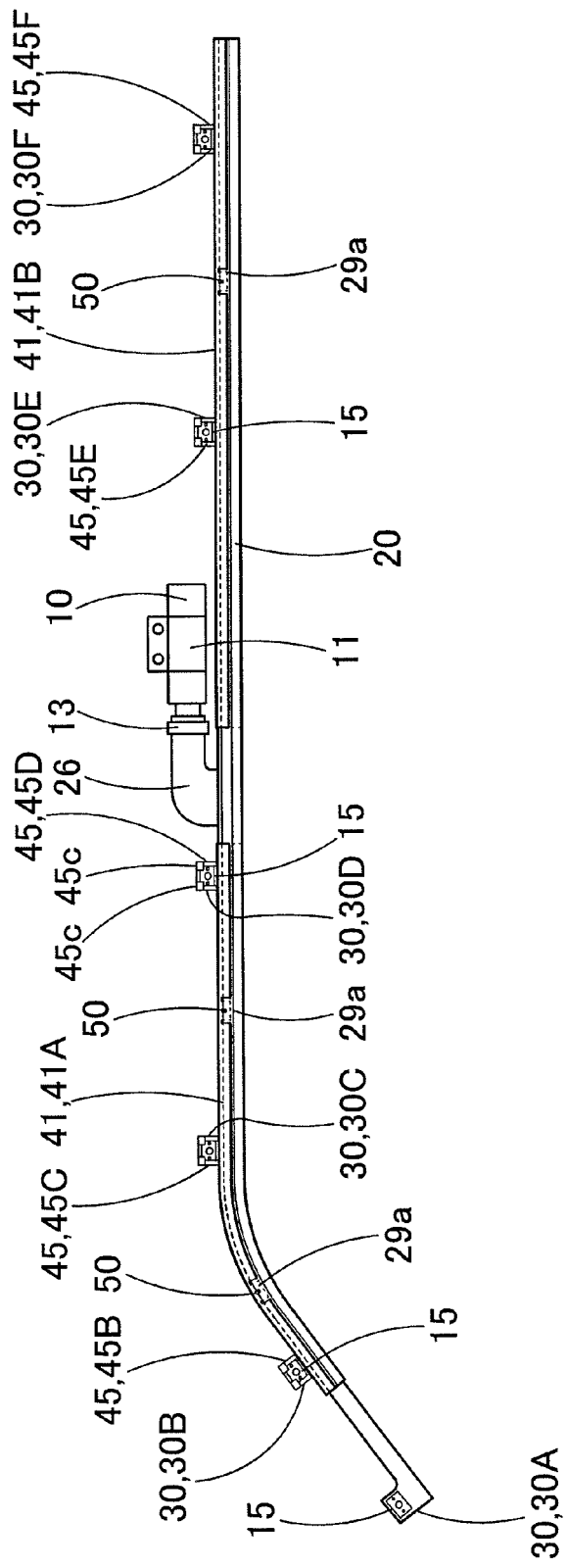
FIG. 5 is a front elevation of the airbag apparatus of FIG. 1 before being mounted on a vehicle.

As shown in FIGS. 1 and 5, the head-protecting airbag apparatus M includes an airbag 20, an inflator 10 for supplying inflation gas to the airbag 20, mounting brackets 11 and 15, mounting bolts 12 and 16, and cases 41 (41A and 41B) for housing the airbag 20. When mounted on the vehicle V, an airbag cover 18 covers inboard sides of the airbag 20, the inflator 10 and the case 41. In the illustrated embodiment, the airbag cover 18 is comprised of a lower periphery 5a of a front pillar garnish 5 covering an inboard side of the front pillar FP and a lower periphery 6a of a roof head liner 6 covering an inboard side of the roof side rail RR.

The front pillar garnish 5 and the roof head liner 6 are fabricated of synthetic resin, and are mounted on an inboard side of an inner panel 2 by unillustrated mounting means, at locations of the front pillar FP and roof side rail RR. The inner panel 2 is part of the vehicle body structure 1. The middle pillar garnish 7 and the rear pillar garnish 8 are made from synthetic resin and mounted on the inner panel 2 as well. As indicated by double-dashed lines in FIGS. 2 and 3, the airbag cover 18, i.e., the lower peripheries 5a and 6a of the front pillar garnish 5 and roof head liner 6, is designed to open inward when pushed by the airbag 20 and allows the airbag 20 to emerge therefrom.

The inflator 10 is formed into a generally columnar contour, and has unillustrated gas discharge ports at the leading end or front end. The inflator 10 is inserted into a joint port 26 of the airbag 20 at the region on the leading end including the gas discharge ports, and is joined with the airbag 20 using a clamp 13 mounted around the rear end of the joint port 26. Further, the inflator 10 is secured to the inner panel 2 by a mounting bracket 11 holding the inflator 10 and mounting bolts 12 for securing the bracket 11 to the inner panel 2.

Figure 2:
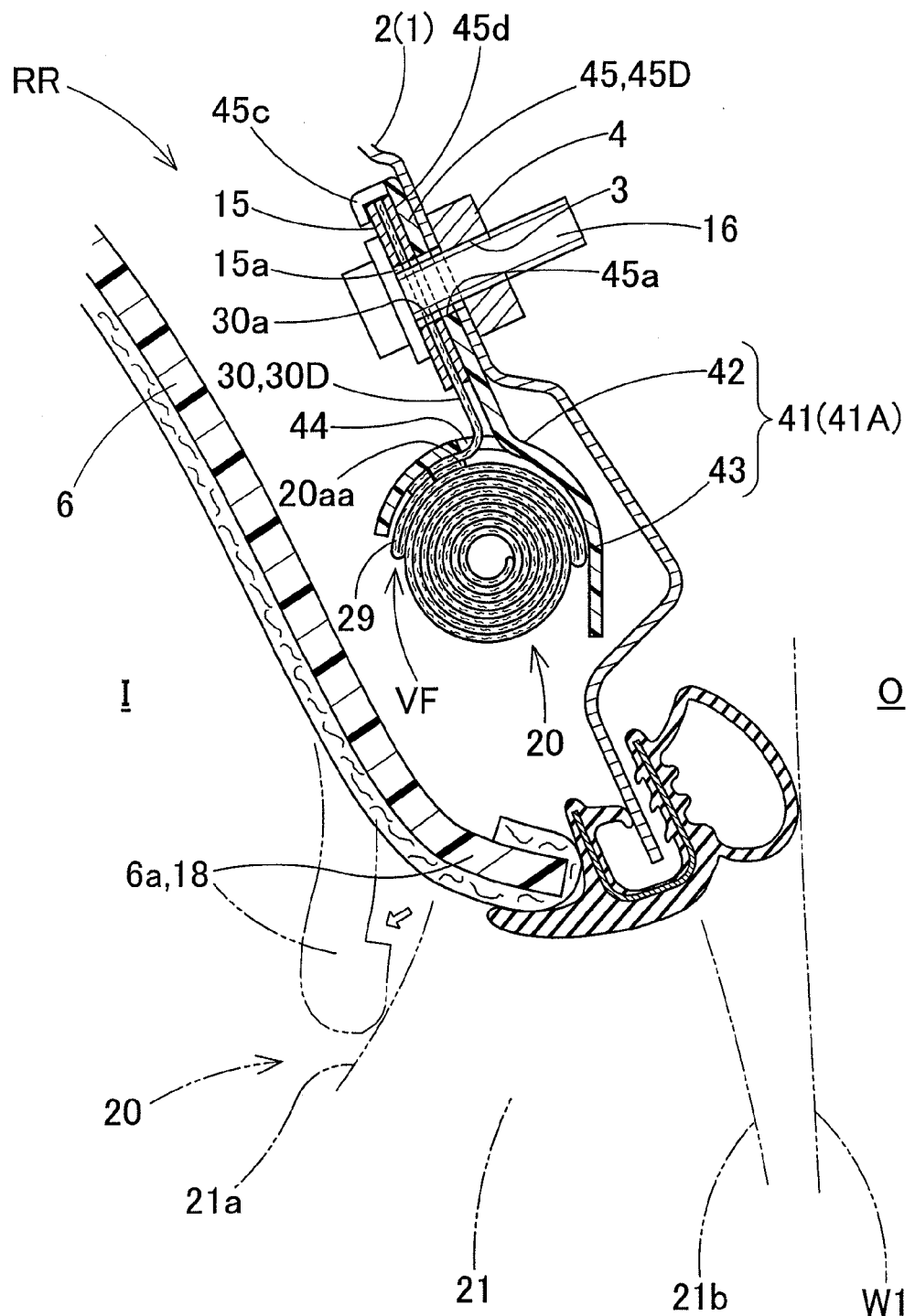
FIG. 2 is a vertical section of the airbag apparatus of FIG. 1 on board, taken along line II-II of FIG. 1.
Figure 3:
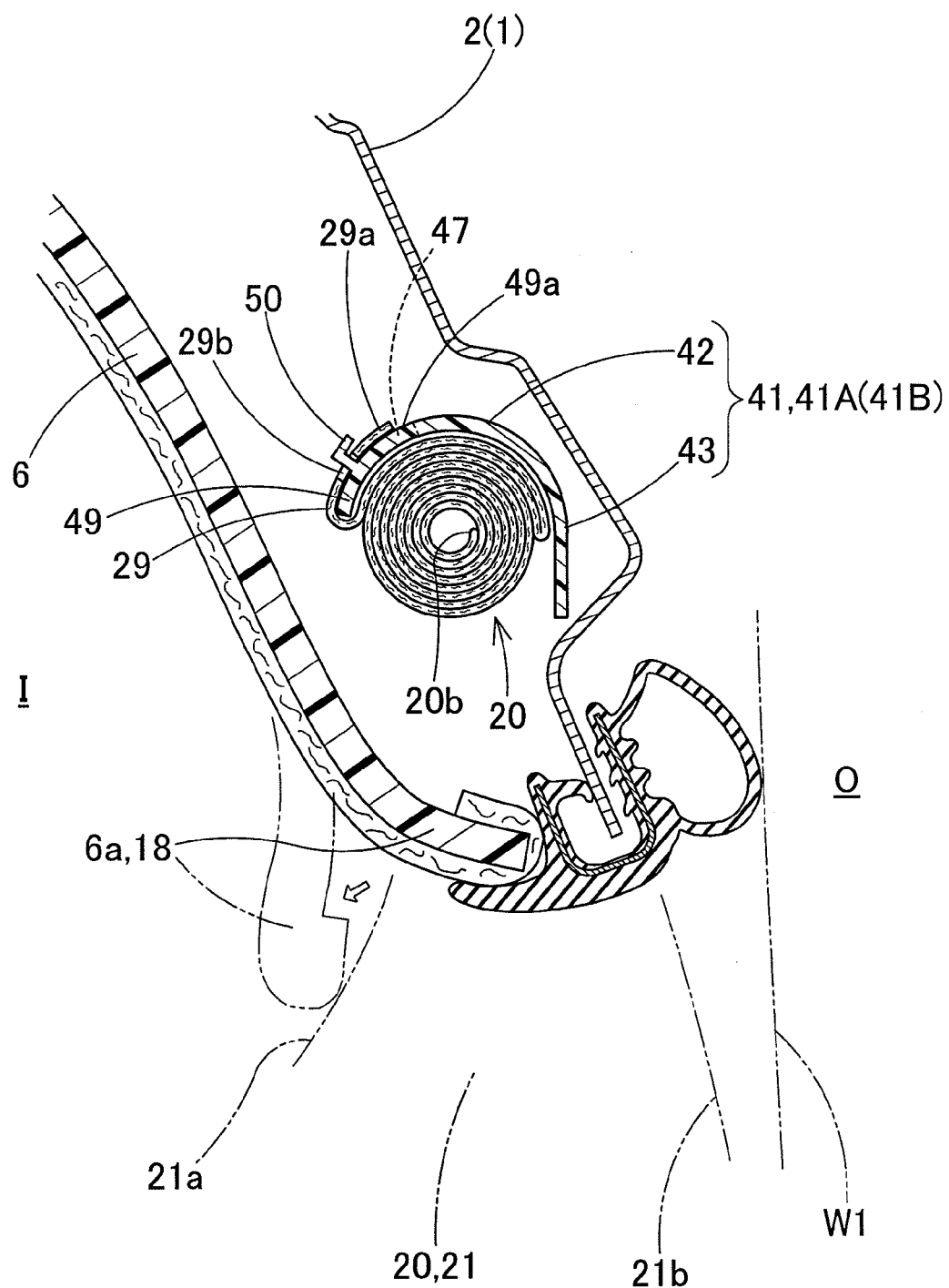
FIG. 3 is a vertical section of the airbag apparatus of FIG. 1 on board, taken along line of FIG. 1.
Figure 4A:
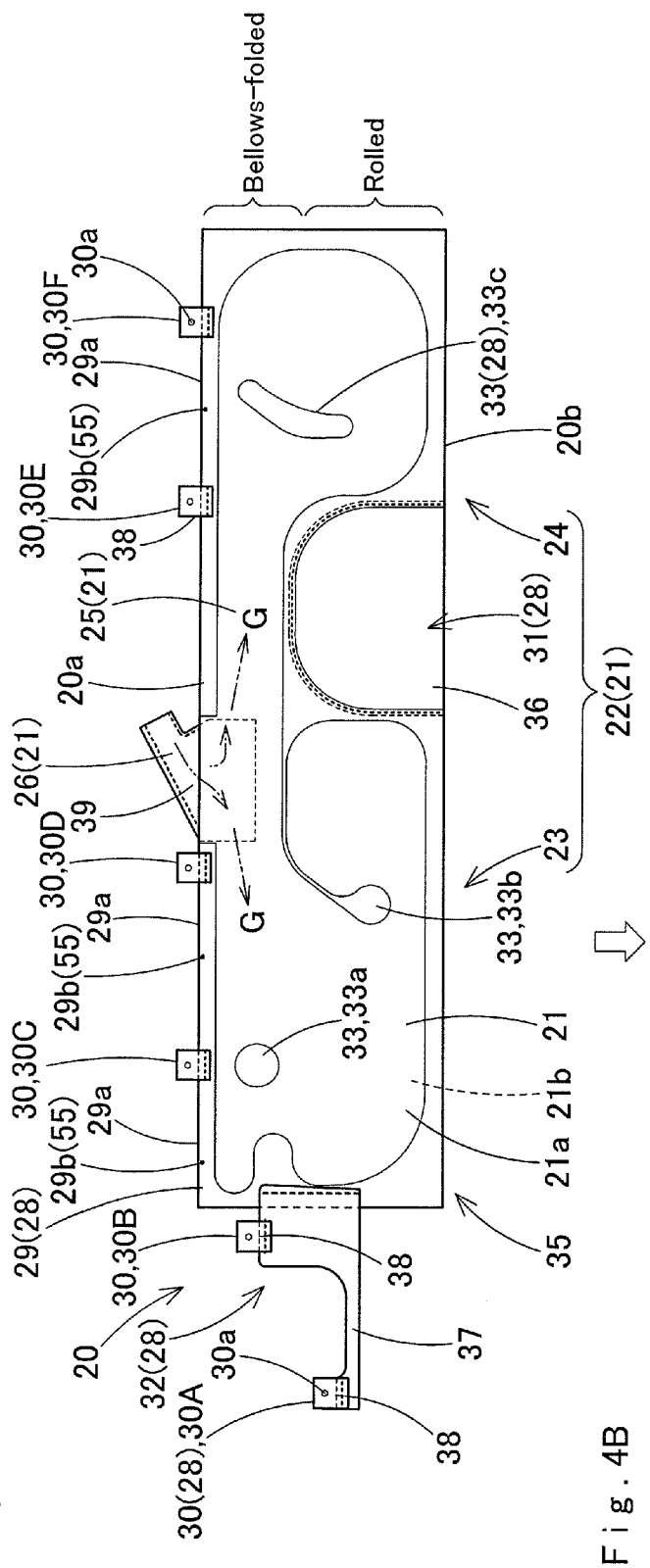
FIGS. 4A and 4B illustrates the way the airbag is folded up.

As indicated by double-dashed lines in FIGS. 2 and 3 and as shown in FIG. 4A, the airbag 20 includes a gas admissive region 21 which is inflatable with an inflation gas in such a manner as to separate an inboard side wall 21a and outboard side wall 21b, and a non-admissive region 28 which admits no inflation gas G. The inboard side wall 21a and outboard side wall 21b are connected to each other at the non-admissive region 28. The gas admissive region 21 includes a protection portion 22, a gas feed passage 25 and the joint port 26, whereas the non-admissive region 28 includes a peripheral portion 29, mounting portions 30, panel portions 31 and 32, and partitioning portions 33.

The protection portion 22 of the gas admissive region 21 includes a front protection portion 23 adapted to cover the window W1 disposed at a side of a front seat and a rear protection portion 24 adapted to cover the window W2 disposed at a side of a rear seat upon airbag deployment. The gas feed passage 25 extends forward and rearward from the joint port 26 along the upper rim 20a of the airbag 20, in order to deliver the inflation gas G from the joint port 26 to the front and rear protection portions 23 and 24. The joint port 26 is disposed at the vicinity of the center in a front and rear direction of the upper rim 20a of the airbag 20 for introducing the inflation gas G from the inflator 10 into the protection portion 22.

The airbag 20 includes in its inner area a plurality of partitioning portions 33 and a panel portion 31. The partitioning portions 33 and panel portion 31 help reduce the dimension of the airbag in a front and rear direction and regulate the thickness upon airbag deployment such that the airbag 20 forms a board shape elongated in a front and rear direction upon deployment. The partitioning portions 33 are disposed in the areas of the front protection portion 23 and rear protection portion 24. More specifically, as shown in FIG. 4A, the partitioning portions 33 are comprised of a circular sealed portion 33a disposed in a front upper region of the front protection portion 23, a generally reverse L-shaped sealed portion 33b extending forward from the panel portion 31, and a boomerang-shaped sealed portion 33c disposed in the rear protection portion 24.

The peripheral portion 29 of the non-admissive region 28 is located in the outer periphery of the gas admissive region 21. The panel portion 31 has a generally rectangular panel shape and is located between the front and rear protection portions 23 and 24, below the gas feed passage 25. The panel portion 32 is disposed at the front end of the airbag 20 and has a generally rectangular panel shape, with a band-shaped portion extending forward from the bottom. The panel portions 31 and 32 act to define an entire contour of the airbag 20 as well as to minimize the time period from the start to completion of inflation of the airbag 20 by reducing the volume of the gas admissive portion of the airbag 20.

Figure 4B:
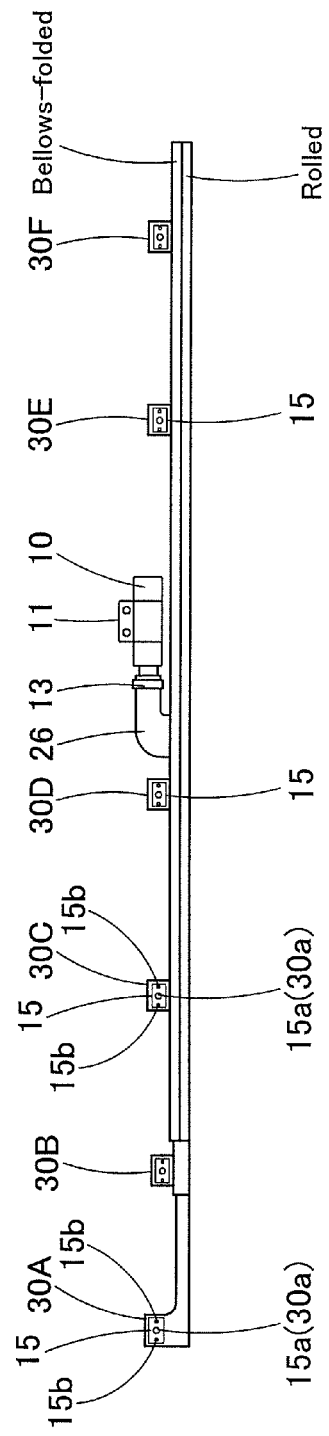

The mounting portions 30 are so arranged in plurality as to project upward from the upper rim 20a of the airbag 20 including the panel portion 32. Each of the mounting portions 30 includes an aperture 30a for receiving a mounting bolt 16 for attachment of the airbag 20 to the inner panel 2. A pair of mounting brackets 15, which are made of sheet metal, are attached to each of the mounting portions 30. Specifically, the mounting portion 30 is located between the mounting brackets 15 and the mounting brackets 15 are fastened to the mounting portion 30 partly. Each of the mounting portions 30 is attached to the inner panel 2 as shown in FIG. 2, by the mounting bolt 16 put through the mounting holes 15a of the bracket 15 and aperture 30a. As shown in FIG. 4B, each of the mounting brackets 15 is provided with fastening portions 15b, which are used to fastening against the mounting portion 30, at the front and rear of the mounting hole 15a. As referred to FIG. 2, the mounting bolts 16 are fastened with nuts 4 mounted on mounting holes 3 of the inner panel 2, thereby mounting the mounting portions 30, together with the mounting brackets 15 and later-described mounting tongues 45 of the cases 41, on the inner panel 2 of the vehicle body structure 1.

Figure 8:
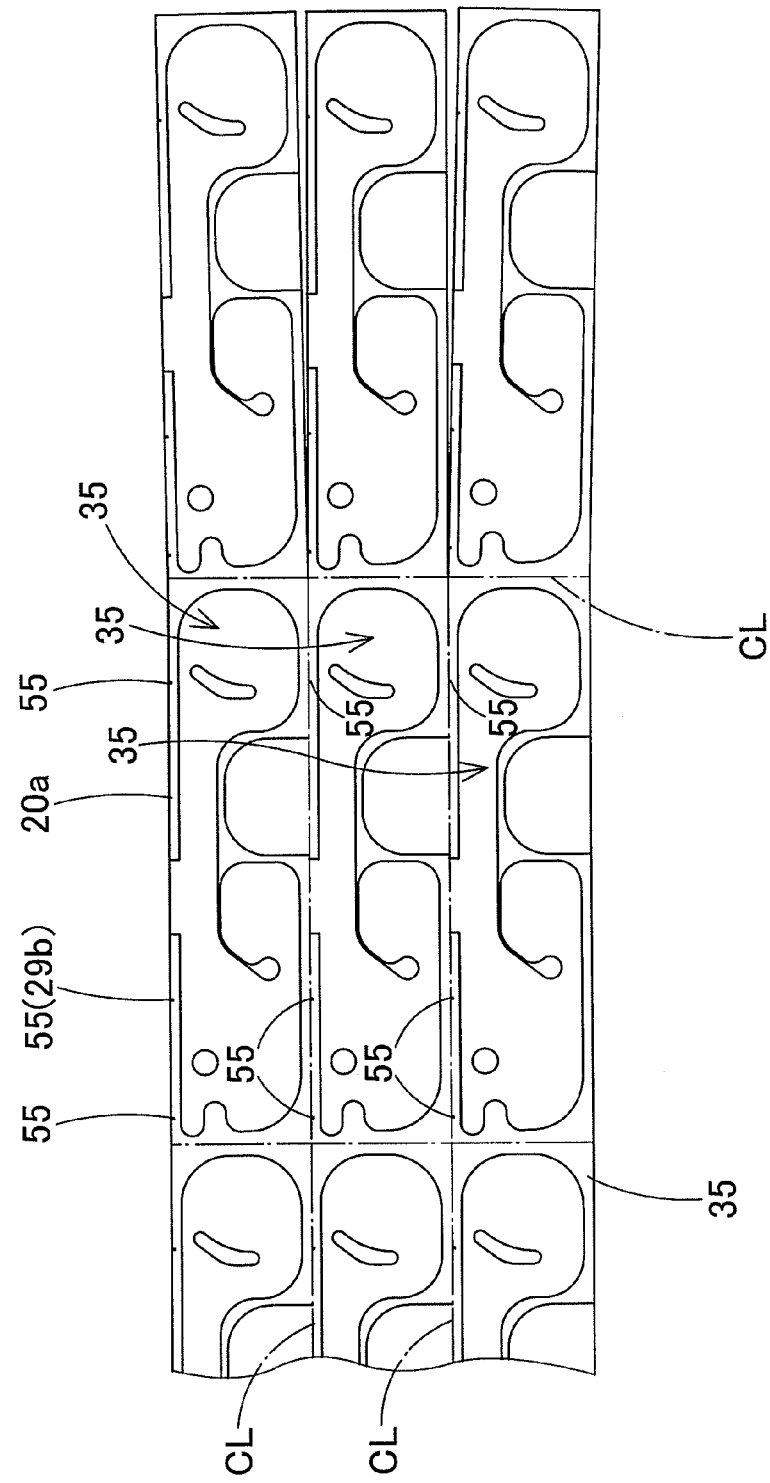
FIG. 8 illustrates the way a plurality of main bodies of the airbag are hollow woven.
Figure 9A:
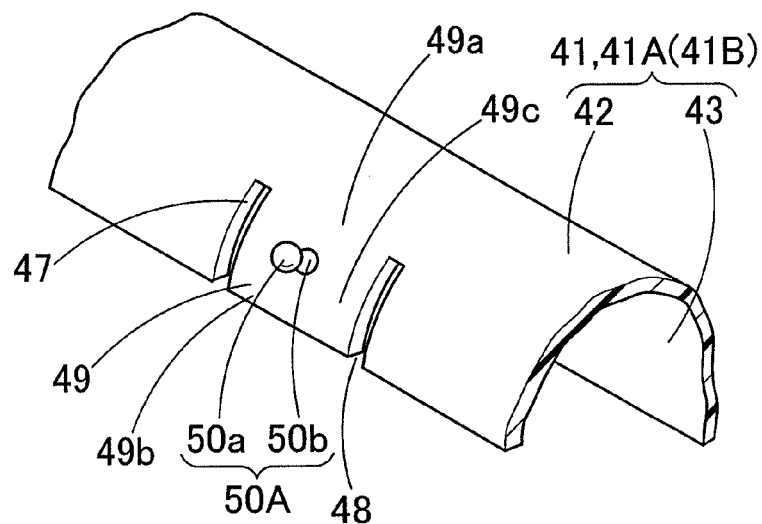
FIG. 9A is a perspective view of a retaining tongue of a case in an alternative embodiment before a retaining projection is inserted through a retaining hole.
Figure 9A:
Figure 9B:
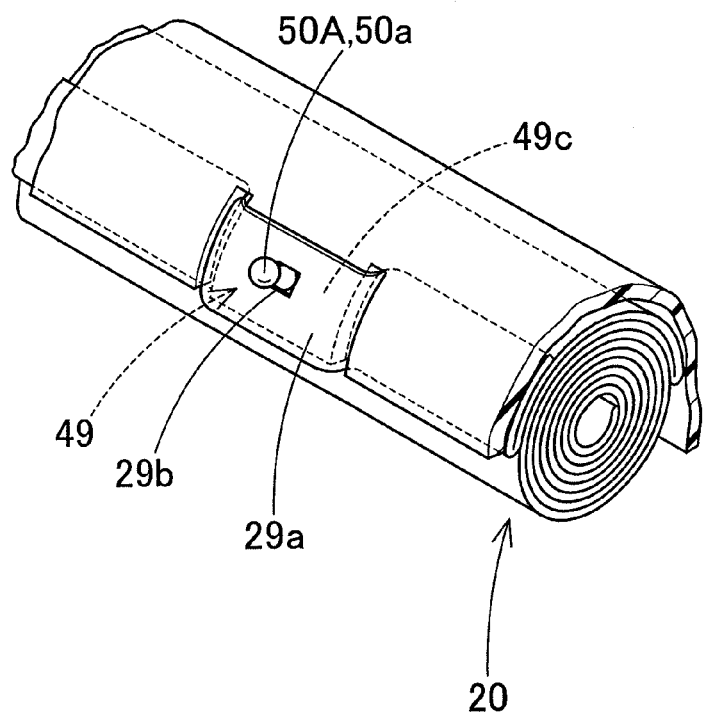
FIG. 9B is a perspective view of the retaining tongue in the alternative embodiment after the retaining projection is inserted through the retaining hole.

As shown in FIGS. 4A and 8, the airbag 20 is comprised of a main body 35 that is formed by hollow-weaving method with polyamide and/or polyester yarns and separate cloths 36, 37, 38 and 39 that are formed of woven fabric of polyamide and/or polyester yarns and sewn to the main body 35. The separate cloth 36 constitutes the panel portion 31, and the separate cloth 37 constitutes the panel portion 32. The separate cloths 38 constitute the mounting portions 30A, 30B, 30C, 30D, 30E and 30F, and the separate cloth 39 constitutes the joint port 26. The main body 35 is rectangular in shape and has a hollow-weave construction. It includes the front protection portion 23, the rear protection portion 24, the gas feed passage 25, the peripheral portion 29, the panel portion 31 and the partitioning portions 33. That is, in this specific embodiment, the mounting portions 30C, 30D, 30E and 30F are located along the upper rim of the main body 35. When the main body 35 is manufactured by hollow weaving, a region of the panel portion 31 is cut away and is used to form the separate cloth 39 which is to constitute the joint port 26. Then the separate cloth 36 is sewn to the cut out region, thus the panel portion 31 is formed.

As shown in FIG. 8, at the hollow-weaving stage, the main body 35 is hollow woven together with two other main bodies into a band in which the three main bodies 35 are laid out in a width direction. Then the hollow-woven band is cut out along the cutting lines indicated by dashed lines in FIG. 8, thereby forming three main bodies 35. A plurality of positioning holes 55 are formed on the hollow-woven band prior to the cutting, and the cutting is conducted with reference to the positioning holes 55.

The positioning holes 55 are located on the peripheral portion 29, along the upper rim 20a of the airbag 20 (or along the upper rim of the main body 35). More specifically, the positioning holes 55 are located in three positions, i.e., two positions in the front, between the mounting portions 30B and 30C and between the mounting positions 30C and 30D, and one position in the rear, between the mounting portions 30E and 30F. As is later described, the positioning holes 55 of this embodiment also serve as retaining holes 29b.

Referring to FIGS. 1 to 3, 5, 6A and 6B, each of the cases 41 is elongated in a front and rear direction and has an inverse U-shaped sectional contour so as to house the airbag 20 in a folded-up state. In this specific embodiment, the cases 41 are comprised of a case 41A for housing the front protection portion 23 and a case 41B for housing the rear protection portion 24, of the folded-up airbag 20. Each case 41 (41A, 41B) is fabricated of such synthetic resin as thermo-plastic elastomer of polyolefin, and includes a ceiling wall section 42 formed into a half-pipe and a vertical wall section 43 extending downward from the edge of the outboard side O of the ceiling wall section 42 as shown in FIG. 2, thereby forming an inverse U-shape in sectional view. As shown in FIG. 5, the case 41A is bent downward at the front region according to the upper rim of the window W1 of the front seat, whereas the case 41B is formed into a generally straight shape extending in a front and rear direction according to the upper rim of the window W2 of the rear seat.

Each of the cases 41 includes in the vicinity of the edge of the outboard side O of the ceiling wall section 42 a plurality of mounting tongues 45 (FIGS. 2 and 5). The locations of the mounting tongues 45 correspond to the mounting portions 30B, 30C, 30D, 30E and 30F of the airbag 20. As shown in FIG. 2, the ceiling wall section 42 is provided, on the inboard side I of and adjacent the base region of the mounting tongues 45, with slots 44 for receiving the mounting portions 30B, 30C, 30D, 30E and 30F. The mounting portion 30A and its vicinity of the airbag 20, i.e., the front end region of the airbag 20, is not housed in the case 41A, and protrudes forward from the case 41A.

As shown in FIG. 2, each of the mounting tongues 45 includes an aperture 45a for receiving the mounting bolt 16 as well as the mounting portion 30 of the airbag 20 and the mounting bracket 15. At the front and rear upper corners of the mounting tongues 45 are holding tongues 45c that project toward an inboard side I and then bend downward so as to have a L-shaped sectional contour. When the folded-up airbag 20 is housed in the cases 41A and 41B, the mounting portions 30B, 30C, 30D, 30E and 30F with the mounting brackets 15 are inserted through the slots 44 and placed on inboard side surfaces 45d of the mounting tongues 45. At this time, the holding tongues 45c hold the inboard side surfaces of the mounting portions 30B, 30C, 30D, 30E and 30F (more precisely, the inboard side surfaces of the mounting brackets 15). As a result, each of the mounting portions 30B, 30C, 30D, 30E and 30F with the mounting brackets 15 is attached to the mounting tongue 45 of the case 41A/41B in a clamped manner between the holding tongues 45c and the inboard side surface 45d of the mounting tongue 45.

Figure 6A:
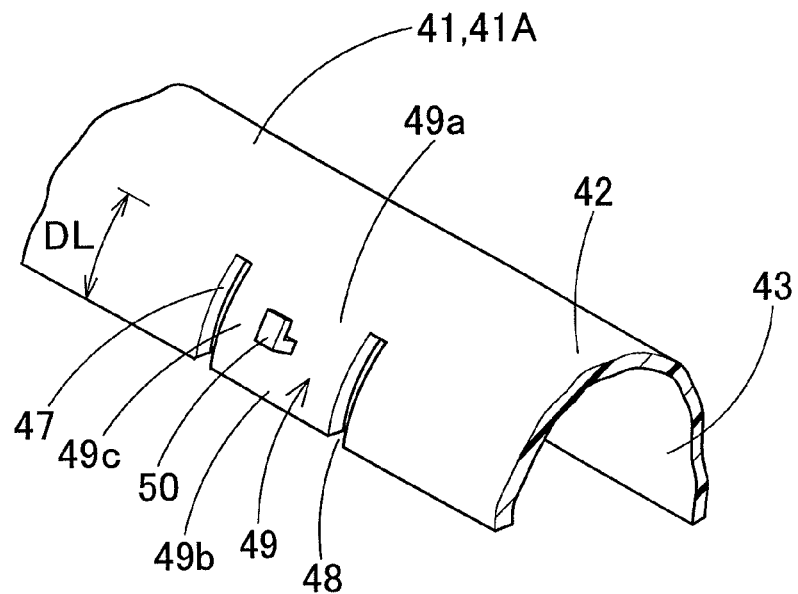
FIG. 6A is a perspective view of a retaining tongue of a case before a retaining projection is inserted through a retaining hole.
Figure 6B:
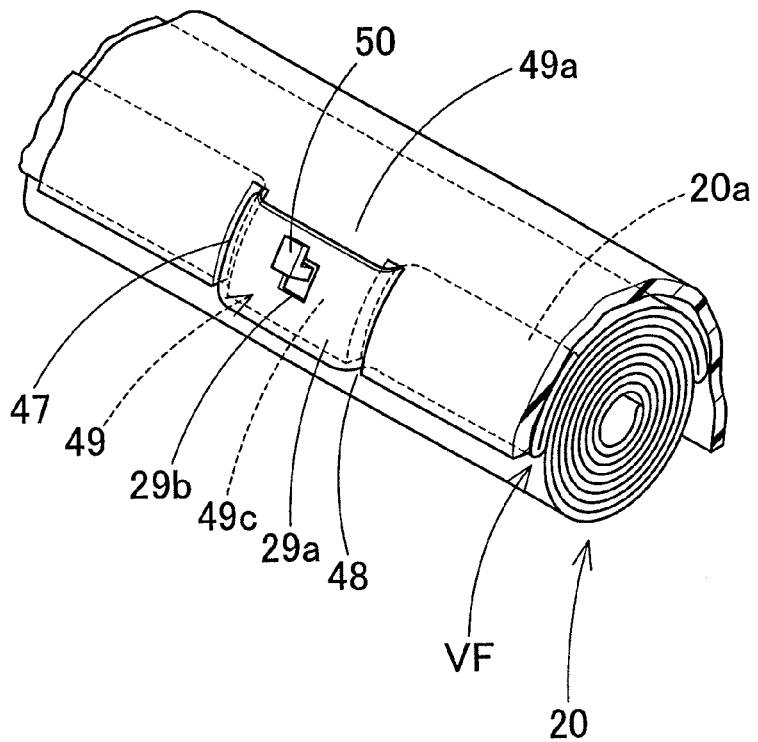
FIG. 6B is a perspective view of the retaining tongue after the retaining projection is inserted through the retaining hole.
Figure 7A:
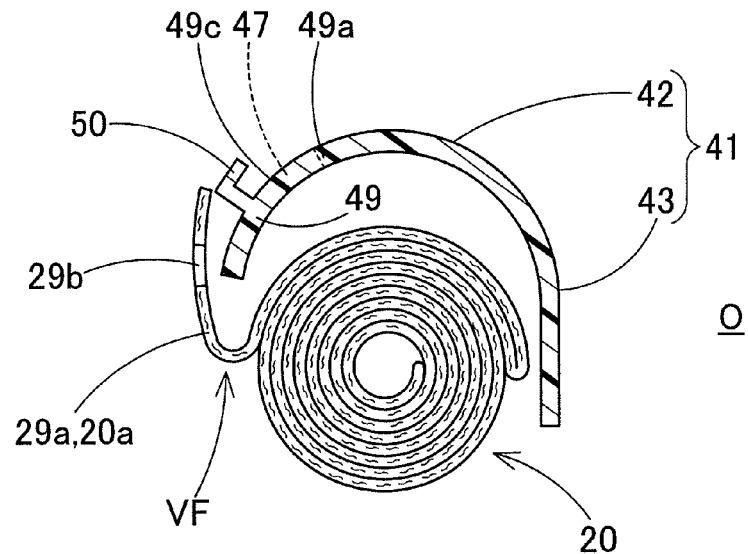
FIGS. 7A to 7C illustrate by sectional views the way the retaining projection is inserted through the retaining hole of the airbag.
Figure 7B:
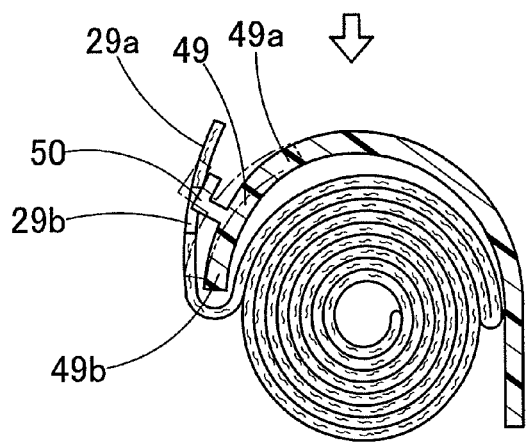

Referring to FIGS. 3, 5, 6A and 6B, the cases 41A and 41B respectively include retaining projections 50 on the outer circumferential surface 49c. The retaining projections 50 are formed at the positions corresponding to the retaining holes 29b (positioning holes 55) of the airbag 20, between predetermined mounting tongues 45 (between the mounting tongues 45B and 45C, between the mounting tongues 45C and 45D and between the mounting tongues 45E and 45F), and are inserted through the retaining holes 29b and retain the upper rim 20a of the airbag 20. The retaining projections 50 are respectively formed into a hook (or a L shape) extending upward and toward an outboard side O, and are located on retaining tongues 49 each of which is comprised of part of the ceiling wall section 42. The ceiling wall section 42 is provided, in front of and at the rear of each of the retaining tongues 49, with openings 47 and 48 extending toward an outboard side O from the edge on the inboard side I of the ceiling wall section 42, and each of the retaining tongues 49 is comprised of the region of the ceiling wall section 42 between the openings 47 and 48. That is, each of the retaining tongues 49 has a cantilever structure, due to the openings 47 and 48 running through the case 41A/41B in front of and at the rear of the retaining tongue 49. Regions provided between the leading ends of the openings 47 and 48 serve as hinge regions 49*a* of the retaining tongues 49, such that the leading end regions 49*b* of the retaining tongues 49 are flexible toward an inner side of the case 41A/41B (FIG. 7B).

The depth DL (FIG. 6A) of the openings 47 and 48, or the length of the retaining tongue 49 from the hinge region 49*a* to the leading end 49*b*, is so determined as not to affect the folded-up configuration of the upper rim 20*a* (or later-described pullout sections 29*a*) of the airbag 20 as much as possible when the retaining projections 50 are inserted through the retaining holes 29*b*. In other words, the depth DL is such a dimension that the leading end 49*b* of the retaining tongue 49 is fittedly housed at the outboard side O of an uppermost, inboard side fold VF of the upper rim 20*a* of the airbag 20 except the mounting portion 30 (i.e., inside the fold VF) when the retaining projections 50 are inserted through the retaining holes 29*b*, as shown in FIGS. 6A, 6B, and 7C.

Figure 7C:
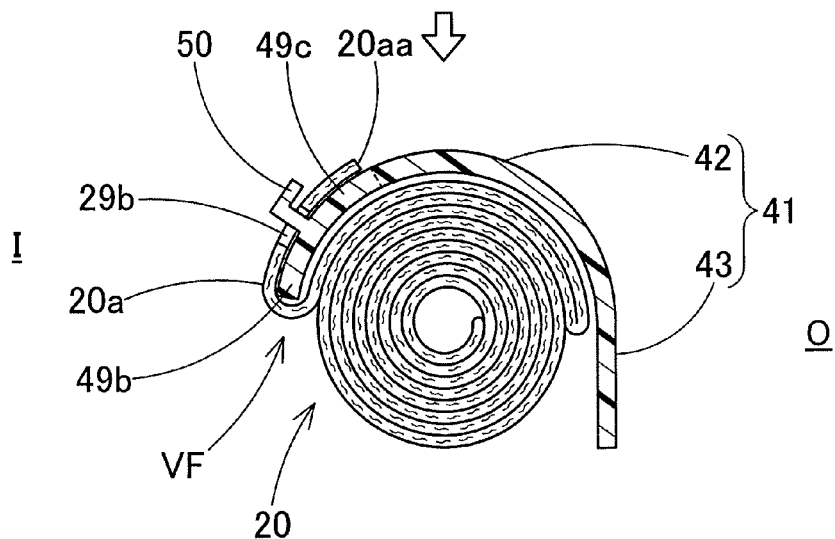

Supplementarily, in the folded-up configuration of the upper rim 20*a* of the airbag 20 except the mounting portion 30, the uppermost inboard side fold VF is so formed that the terminal 20*aa* of the upper rim 20*a* is directed toward an outboard side O, as shown in FIGS. 2 and 7C.

The process of mounting the head-protecting airbag apparatus M on a vehicle V is now schematically described. Firstly, the airbag 20 is laid out in a flattened and deflated state as shown in FIG. 4A, and then folded up. Specifically, an area of the airbag 20 from the upper rim 20*a* to the gas feed passage 25 is folded in a bellows fashion, on creases parallel to the upper rim 20*a*, whereas an area to the lower rim 20*b* is rolled from the lower rim 20*b*, on the outboard side wall 21*b*, as shown in FIG. 2. The bellows folding of the upper area is so conducted as to pile bellows below the uppermost crease VF, which is closest to the upper rim 20*a* and is to face toward an inboard side I when the airbag apparatus M is mounted on a vehicle V.

After the folding, a breakable wrapping member (not shown) is wound around the airbag 20 for keeping the folded-up configuration. However, vicinities of the retaining holes 29*b*, i.e., pullout sections 29*a*, are left unwrapped such that the pullout sections 29*a* may be easily pulled out and placed over the outer circumferential surfaces 49*c* of the retaining tongues 49 of the cases 41A and 41B.

Subsequently, the inflator 10 with the mounting bracket 11 mounted thereon is joined with the joint port 26 of the airbag 20 by the clamp 13, and the mounting brackets 15 are fastened to and attached to the mounting portions 30 of the airbag 20.

Then the front protection portion 23 of the airbag 20 is housed in the case 41A, and then the rear protection portion 24 is housed in the case 41B. The mounting portions 30B, 30C, 30D, 30E and 30F are inserted through the slots 44 and placed on the inboard side surfaces 45*d* of the predetermined mounting tongues 45. Thus each of the mounting portions 30B, 30C, 30D, 30E and 30F is clamped between the holding tongues 45*c* and the inboard side surface 45*d* of the mounting tongue 45 together with the mounting brackets 15, and attached to the mounting tongue 45 of the case 41A/41B.

The housing of the airbag 20 in the cases 41A and 41B is conducted step by step from the front side or from the rear side. By way of example, if it is started from the front side, the mounting portion 30B, with the mounting bracket 15, is taken out from an inner side to an outer side of the case 41A through the slot 44 and attached to the mounting tongue 45B, and the airbag 20 is housed inside the case 41A. Then the next mounting portion 30C is taken out from the inner side to the outer side of the case 41A through the slot 44 and attached to the mounting tongue 45C, and the airbag 20 is housed inside the case 41A. This process is repeated until the airbag 20 is thoroughly housed in the cases 41A and 41B. Thereafter a wrapping member is wound therearound suitably in order to prevent separation of the cases 41A and 41B and airbag 20.

The airbag 20 includes the retaining holes 29*b* on the upper rim 20*a*, between the adjoining pairs of the mounting portions, i.e., between the mounting portions 30B and 30C, between the mounting portions 30C and 30D and between the mounting portions 30E and 30F. As shown in FIGS. 7A to 7C, the pullout sections 29*a*, which surround the retaining holes 29*b*, are taken out and pulled up via the openings 47 and 48, and placed over the outer circumferential surfaces 49*c* of the retaining tongues 49 to insert the retaining projections 50 through the retaining holes 29*b*.

If, at this time, twisting occurs between the mounting portions 30B and 30C, the pullout section 29*a* there between is also twisted and therefore cannot be taken out via the openings 47 and 48 to be placed over the outer circumferential surface 49*c* of the retaining tongue 49 of the case 41A. That is, twisting is here detected immediately and corrected such that the retaining projection 50 is inserted through the retaining hole 29*b*, and then the next mounting portion 30C is taken out to the outer side of the case 41A through the slot 44 and attached to the mounting tongue 45C. Thereafter the following pullout section 29*a* is placed over the outer circumferential surface 49*c* of the retaining tongue 49 to insert the retaining projection 50 through the retaining hole 29*b*, and the following mounting portions 30D, 30E and 30F are sequentially taken out of the slots 44 and attached to the mounting tongues 45D, 45E and 45F. Thus the airbag 20 is housed in the cases 41A and 41B.

Moreover, since the leading end regions 49*b* of the retaining tongues 49 of the cases 41A and 41B are flexible toward an inner side of the cases 41A/41B around the hinge regions 49*a* as shown in FIG. 7B, the retaining projections 50 can be put through the retaining holes 29*b* easily by pushing each of the retaining tongues 49 inward, which will not increase the time required for the housing work.

Therefore, with the head-protecting airbag apparatus M, the folded-up airbag 20 is easily housed in the cases 41A and 41B without causing twists of the airbag.

The head-protecting airbag apparatus M can be doubled in the vicinity of the joint port 26, between the cases 41A and 41B, for transportation and storage until it is mounted on a vehicle V. When mounted on a vehicle V, the mounting brackets 11 and 15 are disposed on predetermined locations of the inner panel 2 and fastened with bolts 12 and 16. Thereafter, an unillustrated lead wire extending from a control device for the inflator 10 is connected to the inflator 10, and the front pillar garnish 5, the roof head liner 6, the middle pillar garnish 7 and the rear pillar garnish 8 are attached to the inner panel 2. Thus the head-protecting airbag apparatus M is mounted on the vehicle V.

When the airbag apparatus M is actuated after being mounted on the vehicle V to activate the inflator 10 to supply an inflation gas G to the airbag 20, the inflation gas G flows into the gas feed passage 25 and then into the front and rear protection portions 23 and 24. The airbag 20 then pushes and opens the airbag cover 18 and deploys downward to cover the interior sides of the windows W1, W2, the middle pillar CP and rear pillar RP, as indicated by double-dashed lines in FIG. 1.

Although some sections of the upper rim 20*a* of the airbag 20, i.e., the pullout sections 29*a*, are placed over the outer circumferential surface 49*c* of the cases 41, not inside the case 41, this will not hinder the airbag deployment, since the retaining tongues 49 are flexible and the pullout sections 29a can be disengaged from the retaining projections 50 and the retaining tongues 49 due to flexibility of the retaining tongues 49 are flexible, if necessary.

Moreover, in the head-protecting airbag apparatus M, the main body 35 of the airbag 20 has a hollow-weave construction and includes the gas admissive region 21 that is inflatable with an inflation gas G in such a manner as to separate the inboard side wall 21a and the outboard side wall 21b, and the peripheral portion 29 that is located around the gas admissive region 21 and is so formed that the inboard side wall 21a and the outboard side wall 21b are connected to each other. The main body 35 is one of a plurality of main bodies that are arranged in parallel and hollow woven at a time and then is subjected to cutting, and the retaining holes 29 are comprised of the positioning holes 55 that are used for the cutting of the main bodies 35 and are located on the peripheral portion 29, in the upper rim 20a of the main body 35. This configuration will eliminate the need to form a separate retaining hole, thereby facilitating the manufacturing of the airbag 20.

The retaining projection 50 of the cases 41A and 41B in the foregoing embodiment is formed into a L-shaped hook whose leading end is turned upward and toward an outboard side O. This configuration will prevent the retaining projections 50 from being disengaged from the retaining holes 29b as much as possible before the mounting on a vehicle. However, the contour of the retaining projection 50 should not be limited thereby. By way of example, it may also be formed like a retaining projection 50A shown in FIGS. 9A, 9B, 10A, 10B and 100. The retaining projection 50A is comprised of a columnar neck portion 50b projecting out of the retaining tongue 49 and a retaining head 50a located at the leading end of the neck portion 50b and bulged substantially spherically.

Figure 10A:
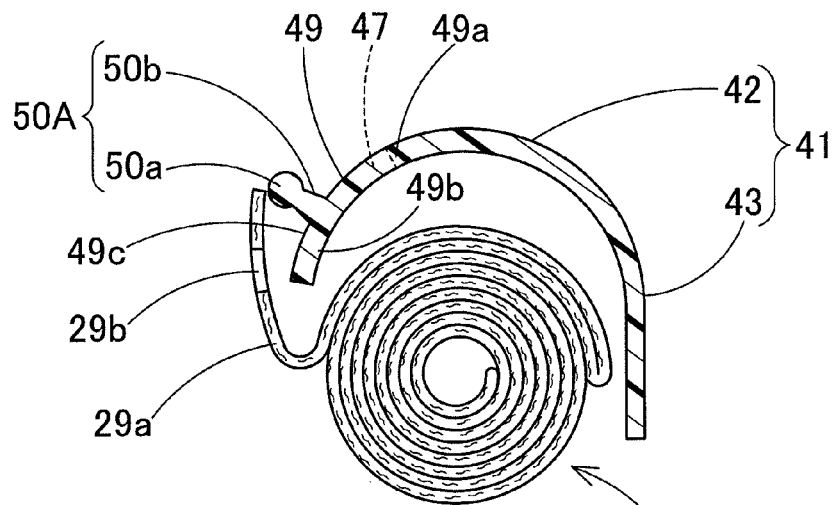
FIGS. 10A to 10C illustrate by sectional views the way the retaining projection of the alternative embodiment is inserted through the retaining hole of the airbag.
Figure 10B:
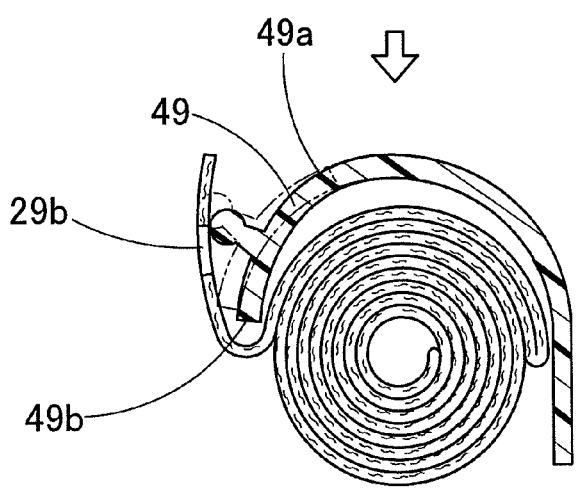
Figure 10C:
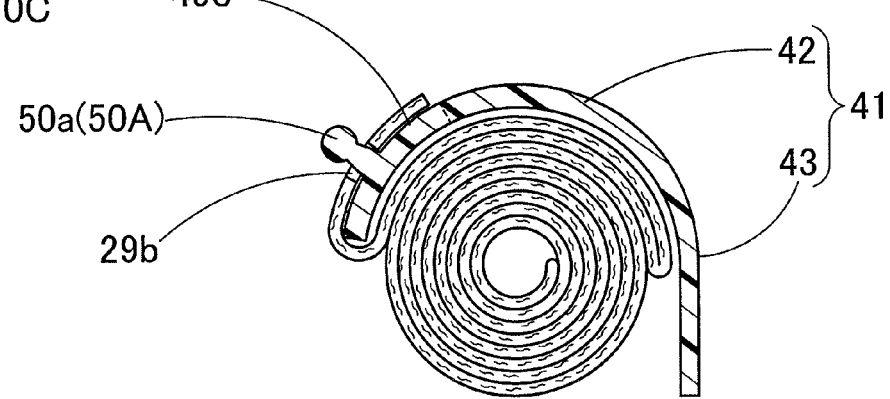

Also with this configuration, the retaining projection 50A can be put through the retaining hole 29b easily since the leading end region 49b of the retaining tongue 49 of the case 41 is flexible toward an inner side of the case 41 around the hinge region 49a as shown in FIGS. 10A to 10C. Thus, by pushing the retaining tongue 49 inward, the retaining head 50a of the retaining projection 50A is easily inserted through the retaining hole 29b such the pullout section 29a is retained by the retaining projection 50A.

Moreover, if the retaining projection is comprised of a columnar neck portion and a retaining head that bulges at the leading end of the neck portion, the contour of the retaining head should not be limited only to a spherical shape, but may also be a substantially conical shape or the like.

The airbag 20 of the foregoing embodiment has three retaining holes 29b whereas three retaining tongues 49 with the retaining projections 50 are formed on the cases 41 so as to be received by the retaining holes 29b. However, the number of the retaining holes and retaining projections can be varied. If the airbag is more likely to be twisted, the number can be increased, by way of example, up to all locations between the mounting portions. To the contrary, if the airbag has a less region which would tend to be twisted, the number of the retaining holes and retaining projections can be reduced.

The number of the retaining holes formed between a pair of the adjoining mounting portions should not be limited to one. More than one retaining holes may be formed between a pair of the adjoining mounting portions, with corresponding retaining projections and retaining tongues on the case.

Furthermore, the cases 41 of the foregoing embodiment have been described as having the mounting tongues 45 that hold the mounting portions 30 of the airbag 20 and fastened to the inner panel 2 by the mounting bolts 16 together with the mounting portions 30 and mounting brackets 15. However, the case may be so configured as to be bolt fastened to the inner panel at a location separate from the mounting portions. Nevertheless, the case must be provided with slots for letting out the mounting portions of the airbag to the outer circumference of the case. Each of the slots does not have to be formed into such a slit as surrounded by the ceiling wall portion 42, but may be comprised of a recess which recesses from an inboard side edge or from an outboard side edge, of the case.

What is claimed is:

1. A head-protecting airbag apparatus adapted to be mounted on a vehicle body structure, along an upper rim of and along a front and rear direction of a window of a vehicle, the apparatus comprising:

an airbag for deployment over the window, the airbag being folded up in such a manner that a lower rim thereof is brought close to an upper rim thereof, and including a main body, a plurality of mounting portions that are located along an upper rim of the main body and serve for attachment to the vehicle body structure, and a retaining hole that pierces the upper rim of the main body and is located between at least one pair of adjoining mounting portions; and a case that is made from synthetic resin and has an inverse U-shaped sectional contour opening downwardly, and houses the airbag with the mounting portions of the airbag taken out to an outer circumference of the case such that the case is mounted on the vehicle together with the airbag by fastening of the mounting portions to the vehicle body structure, the case including:

a retaining projection that protrudes from the outer circumference of the case at a location corresponding to the retaining hole of the airbag and is inserted through the retaining hole for retaining the upper rim of the airbag;

a pair of openings that are formed in front of and at a rear of the retaining projection in such a manner as to extend toward an outboard direction from an inboard side edge of the case; and a retaining tongue that is formed between the openings and has a cantilever structure so as to be flexible toward an inner side of the case, wherein a section of the airbag in a vicinity of the retaining hole is placed over an outer circumferential surface of the retaining tongue via the openings in order that the retaining projection is inserted through the retaining hole.

2. The head-protecting airbag apparatus of claim 1, wherein:

the main body of the airbag has a hollow-weave construction and includes a gas admissive region that is inflatable with an inflation gas in such a manner as to separate an inboard side wall and an outboard side wall, and a peripheral portion that is located around the gas admissive region and is so formed that the inboard side wall and the outboard side wall are connected to each other;

the main body is one of a plurality of main bodies that are arranged in parallel and hollow woven at a time and then is subjected to cutting; and the retaining hole is comprised of a positioning hole that is used for the cutting of the main bodies and is located on the peripheral portion, in the upper rim of the main body.

3. The head-protecting airbag apparatus of claim 1, wherein the retaining projection is formed into a bent hook extending upwardly.

4. The head-protecting airbag apparatus of claim 1, wherein the retaining projection includes a leading end that bulges in a spherical shape.

\* \* \* \* \*